United States Patent
Makino et al.

(10) Patent No.: US 7,704,407 B2
(45) Date of Patent: Apr. 27, 2010

(54) OXYGEN-ABSORBING CONTAINER CAP

(75) Inventors: Ryosei Makino, Hyogo (JP); Tadayoshi Takashima, Hyogo (JP); Kazuhiro Sasakura, Hyogo (JP)

(73) Assignee: Nihon Yamamura Glass Co., Ltd., Hyogo (JP)

( * ) Notice: Subject to any disclaimer, the term of this patent is extended or adjusted under 35 U.S.C. 154(b) by 0 days.

(21) Appl. No.: 11/921,769

(22) PCT Filed: Jun. 15, 2005

(86) PCT No.: PCT/JP2005/010973

§ 371 (c)(1),
(2), (4) Date: Mar. 7, 2008

(87) PCT Pub. No.: WO2006/134652

PCT Pub. Date: Dec. 21, 2006

(65) Prior Publication Data

US 2009/0048104 A1 Feb. 19, 2009

(51) Int. Cl.
- C06B 23/00 (2006.01)
- C06B 43/00 (2006.01)
- C01B 3/00 (2006.01)
- C01B 6/00 (2006.01)
- C02F 1/70 (2006.01)
- C01B 17/62 (2006.01)
- B01J 20/26 (2006.01)

(52) U.S. Cl. .............. 252/188.28; 252/188.21; 502/402

(58) Field of Classification Search .......... 502/402; 252/188.21, 188.28
See application file for complete search history.

(56) References Cited

U.S. PATENT DOCUMENTS 5,153,038 A * 10/1992 Koyama et al. ............ 428/35.8

(Continued)

FOREIGN PATENT DOCUMENTS

EP 0 328 336 8/1989

(Continued)

OTHER PUBLICATIONS

Griffin WC: "Calculation of HLB Values of Non-Ionic Surfactants," Journal of the Society of Cosmetic Chemists 5 (1954): 259.*

(Continued)

Primary Examiner—Jerry Lorengo
Assistant Examiner—Eli Mekhlin
(74) Attorney, Agent, or Firm—Wenderoth, Lind & Ponack, L.L.P.

(57) ABSTRACT

The present invention provides an oxygen-absorbing resin composition, which is superior in oxygen absorbability, absorbs oxygen remaining in the container after sealing, keeps the contents in the container in good preservation, and improves moldability, dispersibility of the oxygen absorbent, stability of the oxygen absorbing performance, performance of preventing peeling and separation of the oxygen absorbent from the base resin, rigidity of the sealing part, and the like, which become problems in the case of including an oxygen absorbent having high oxygen absorbability and low compatibility with the base resin, as well as provides an oxygen-absorbing container cap and an oxygen-absorbing container plug using the same.

The present invention provides an oxygen-absorbing resin composition characterized by being obtained by dispersing and blending an oxygen absorbent containing 20% or more of particles having a particle diameter of 1000 μm or less at a ratio of 20% or less to a base resin.

5 Claims, 4 Drawing Sheets

U.S. PATENT DOCUMENTS 5,274,024 A * 12/1993 Koyama et al. ............. 524/440
6,391,406 B1    5/2002 Zenner et al.
6,656,383 B1 * 12/2003 Zenner et al. .......... 252/188.28

FOREIGN PATENT DOCUMENTS

| EP | 0 428 736   | 5/1991  |
|----|-------------|---------|
| JP | 01-315438   | 12/1989 |
| JP | 2-308852    | 12/1990 |
| JP | 4-327149    | 11/1992 |
| JP | 06-255680   | 9/1994  |
| JP | 2002-104480 | 4/2002  |
| JP | 2005-193943 | 7/2005  |
| JP | 2005-194373 | 7/2005  |
| JP | 2005-194374 | 7/2005  |

OTHER PUBLICATIONS

International Search Report issued Oct. 11, 2005 in the International (PCT) Application PCT/JP2005/010973 of which the present application is the U.S. National Stage.

Supplementary European Search Report issued Aug. 24, 2009 in corresponding European Application No. 05 75 0875.

* cited by examiner

Fig. 5-B

OXYGEN-ABSORBING CONTAINER CAP

TECHNICAL FIELD

The present invention relates to an oxygen-absorbing resin composition, and a container cap and a container plug of a beverage bottle container, etc., using the same.

BACKGROUND ART

In a packaging container such as a plastic bottle made of polyethylene terephthalate, a glass bottle, or a pouch, since a space that is not filled with the contents of the container, a so-called head space, is formed in the container after sealing, and oxygen remaining in this head space oxidizes and deteriorates the contents, the long-term preservability of the above-described contents is insufficient. For this reason, a container cap as shown in Patent Document 1, Patent Document 2, and Patent Document 3, that is, an oxygen-absorbing container cap containing an oxygen absorbent in a cap of a beverage bottle container, etc., has been proposed conventionally in order to remove the oxygen remaining in this head space.

For example, a container closer containing an oxygen absorbent is described in Patent Document 1, and a container cap, in which oxygen permeability is lowered by containing an ethylene-vinyl alcohol polymer although it is not an oxygen absorbent, is described in Patent Document 2. Further, a container cap, in which an oxygen absorbent, an ethylene-vinyl alcohol polymer, and the like, are contained and a slight unevenness is formed on the surface of an oxygen-absorbent-containing resin layer is described in Patent Document 3.

Patent Document 1: Japanese Patent Application Laid-Open (JP-A) No. 01-315438
Patent Document 2: JP-A No. 02-225568
Patent Document 3: JP-A No. 04-327149

DISCLOSURE OF THE INVENTION

Problems to be Solved by the Invention

However, oxygen absorbability is not yet satisfied in the above-described conventional container caps. That is, sufficient oxygen absorbing performance may not be obtained even in the above-described conventional container caps.

On the other hand, the present inventors investigate about the application of the oxygen absorbent in which compatibility with a base resin is low although the oxygen absorbability is high. However, since the resin that contains such an oxygen absorbent has, in addition to low fluidity and being difficult to be molded, low dispersion of the oxygen absorbent and an unevenness depending the product, stable oxygen absorbing performance cannot be obtained. Further, it is found that high oxygen absorbing performance predicted from the performance of the oxygen absorbent cannot be obtained. Not only that, but also in the case of the oxygen absorbent having low compatibility with the base resin, there is a problem that peeling and separation of the oxygen absorbent from the base resin easily occur due to physical stress and thermal stress by sealing that apply to a sealing part, such as a liner and a packing, which is provided inside of a cap shell of the container cap and seals the container by abutting on a container opening part. Furthermore, sealability of the container cap is maintained by sealing of the liner and the packing. However, when an amount of the oxygen absorbent to be added to the liner and the packing is too much, its rigidity increases, and the sealability may decrease depending on the oxygen absorbent.

The present invention is performed by paying attention to the above-described circumstances, and an object of the present invention is to provide an oxygen-absorbing resin composition, which solves the above-described conventional problems, is superior in oxygen absorbability, absorbs oxygen remaining in the container after sealing, keeps the contents in the container in good preservation, and improves moldability, dispersibility of the oxygen absorbent, stability of the oxygen absorbing performance, performance of preventing peeling and separation of the oxygen absorbent from the base resin, rigidity of the sealing part, and the like, which become problems in the case of including an oxygen absorbent having high oxygen absorbability and low compatibility with the base resin, as well as to provide an oxygen-absorbing container cap and an oxygen-absorbing container plug using the same.

Further, as a result of the present inventors' devoted examination, in the container cap having an oxygen absorbent-containing resin layer in the packing, in the case of the content such as a carbonated drink, it is found that the top face of the packing expands upward due to inner pressure of the container to cause an expanded cap top face, a so-called dome phenomenon depending on the shape of the oxygen absorbent-containing resin layer.

Another object of the present invention is to provide an oxygen-absorbing container cap, which solves the problem of the conventional container cap above, is superior in oxygen absorbability, absorbs oxygen remaining in the container after sealing, keeps the contents in good preservation, can prevent the dome phenomenon due to the inner pressure of the container even in the case where the content is a carbonated drink, etc., and the inside of the container is in a pressurized state, and has good moldability at injection-molding, etc.

Means for Solving the Problems

Thus, the present invention provides an oxygen-absorbing resin composition characterized by being obtained by dispersing and blending an oxygen absorbent containing 20% or more of particles having a particle diameter of 1000 μm or less at a ratio of 20% or less to a base resin.

Further, in order to achieve the above-described objects, the oxygen-absorbing resin composition in the present invention may be obtained by dispersing and blending an oxygen absorbent containing 20% or more of particles having a particle diameter of 1000 μm or less and a water-absorbing material with an HLB (hydrophile-lipophile balance) value of 1.5 or more at a ratio of 20% or less, respectively, to a base resin. The oxygen-absorbing resin composition according to the claimed invention can be used as a material of the general constitution materials of packing container.

On the other hand, in order to achieve the above-described objects, a first oxygen-absorbing container cap in the present invention is an oxygen-absorbing container cap having an oxygen absorbent-containing resin layer inside the container, in which the oxygen absorbent-containing resin layer has a lattice-shaped convex part and/or concave part inside the container.

Further, the above-described oxygen absorbent-containing resin layer may contain a water-absorbing material.

The base resin forming the above-described oxygen absorbent-containing resin layer is preferably a thermoplastic resin having an oxygen permeability of $10^{-4}$ cc·mm/cm²·day·atm or more under condition of 23° C. and 40% RH (Relative Humidity) and a water-absorbing amount of 0.01% or more in pure water of 23° C., and is obtained by including an oxygen absorbent of 1 to 100 parts by weight per 100 parts by weight.

Further, the above-described base resin is preferably obtained by further including a water-absorbing material of 1 to 100 parts by weight per 100 parts by weight.

Further, from another viewpoint, the present invention provides a second oxygen-absorbing container cap that is a container cap having the oxygen absorbent-containing resin layer inside the container, in which the oxygen absorbent-containing resin layer is obtained by dispersing and blending an oxygen absorbent containing 20% or more of particles having a particle diameter of 1000 μm or less at a ratio of 20% or less to a base resin.

Further, in order to achieve the above-described objects, a third oxygen-absorbing container cap in the present invention is a container cap having the oxygen absorbent-containing resin layer inside the container, in which the oxygen absorbent-containing resin layer is obtained by dispersing and blending a water-absorbing material with an HLB value of 1.5 or more at a ratio of 20% or less to a base resin.

The above-described oxygen absorbent-containing resin layer is preferably obtained by dispersing and blending an oxygen absorbent containing 20% or more of particles having a particle diameter of 1000 μm or less at a ratio of 20% or less to a base resin.

The above-described first to third oxygen-absorbing container cap specifically can be an oxygen-absorbing container cap in which the above-described oxygen absorbent-containing resin layer is formed integrally with a cap shell. That is, the above-described oxygen absorbent-containing resin layer can be formed on the entire surface or a part of the inside of the cap shell with an in-shell molding, a multi-layer molding, etc.

Further, a sealing part that seals a container by abutting on a container opening part inside of the cap shell can be an oxygen-absorbing container cap having the oxygen absorbent-containing resin layer. In this case, the above-described sealing part may be configured to be integrated with the cap shell, and the above-described sealing part may be configured as an inner plug that is separated from the cap shell.

That is, the above-described sealing part can be a liner, a packing, etc., configured by molding to be integrated with the cap shell with an in-shell molding, a multi-layer molding, etc., and it can be configured to be integrated by adhering the sealing part such as a packing molded separately with an injection molding, a compression molding, etc., to the cap shell by fusion or adhesion. Further, the above-described sealing part can be configured by combining the cap shell and inner plug so that the inner plug such as a packing molded separately with an injection molding, a compression molding, etc., does not adhere to the cap shell but is not separated.

Further, the entire cap can be an oxygen-absorbing container cap made of the oxygen absorbent-containing resin.

Further, the second and the third oxygen-absorbing container cap can be an oxygen-absorbing container cap in which the above-described oxygen absorbent-containing resin layer is formed from an oxygen absorbent-containing resin film or a multi-layer film in which the oxygen absorbent-containing resin film and a substrate film are pasted together.

Further, from further another viewpoint, the present invention provides an oxygen-absorbing container plug which has an oxygen absorbent-containing resin layer inside the container, wherein the oxygen absorbent-containing resin layer is obtained by dispersing and blending an oxygen absorbent containing 20% or more of particles having a particle diameter of 1000 μm or less at a ratio of 20% or less to a base resin.

In order to achieve the above-described objects, the oxygen-absorbing container plug in the present invention is a container plug which has an oxygen absorbent-containing resin layer inside the container, wherein the above-described oxygen absorbent-containing resin layer may be obtained by dispersing and blending a water-absorbing material with an HLB value of 1.5 or more at a ratio of 20% or less to a base resin.

Further, the above-described oxygen absorbent-containing resin layer may be obtained by dispersing and blending an oxygen absorbent containing 20% or more of particles having a particle diameter of 1000 μm or less at a ratio of 20% or less to a base resin.

EFFECT OF THE INVENTION

In the invention according to Claim 1, problems such as moldability of an oxygen absorbent-containing resin, dispersibility of an oxygen absorbent, stability of oxygen absorbing performance, peeling of the oxygen absorbent, decrease of sealability of a sealing part that seals a container by abutting on a container opening part can be solved by making the particle diameter of the oxygen absorbent specific and dispersing and molding a specific amount of such an oxygen absorbent.

That is, since the oxygen-absorbing resin composition according to Claim 1 is obtained by dispersing and blending an oxygen absorbent containing 20% or more of particles having a particle diameter of 1000 μm or less at a ratio of 20% or less to a base resin, the following effects can be obtained. That is, when the ratio of particle diameter of the oxygen absorbent dispersed and blended to a base resin becomes large, various troubles occur in which the moldability of the oxygen-absorbing resin composition deteriorates, a stable oxygen absorbing performance is hardly obtained because the dispersion of the oxygen absorbent is bad and variation occurs depending on the products, the oxygen absorbing performance cannot be improved because the entire surface area of the oxygen absorbent becomes small, and peeling and separation of the oxygen absorbent from the base resin easily occur. However, in the present invention, by making the particle diameter of the oxygen absorbent specific and dispersing and molding a specific amount of such an oxygen absorbent, the stable oxygen absorbing performance can be obtained in which the moldability of the oxygen absorbent-containing resin is good, the dispersibility of the oxygen absorbent is good, and variation does not occur depending on the products, and peeling and separation of the oxygen absorbent from the base resin hardly occur. Thereby, in the present invention, an oxygen-absorbing resin composition that is superior in oxygen absorbing performance, quickly absorbing oxygen remaining in the container after sealing, and in which the preservability of the contents is good, can be obtained.

Further, in the case of forming the oxygen-absorbing resin composition as a sealing part that seals the opening part of the packaging container such as a beverage bottle container so that it can be opened/closed, when THE ratio of the oxygen absorbent dispersed and blended to a base resin is more than 20%, the rigidity becomes too large and its sealability decreases. However, since the ratio is 20% or less in the oxygen-absorbing resin composition in Claim 1, the increase of the rigidity can be suppressed and its sealability can be maintained certainly.

The invention according to the claims has a configuration in which an oxygen absorbent containing 20% or more of particles having a particle diameter of 1000 μm or less is dispersed and blended at a ratio of 20% or less to a base resin (referred to as a configuration of preceding stage below) and a water-absorbing material with an HLB value of 1.5 or more is dispersed and blended at a ratio of 20% or less to a base resin (referred to as a configuration of succeeding stage below). Then, since the configuration of preceding stage is the same as the configuration of the invention according to Claim 1, the above-described effects obtained by the invention according to Claim 1 are obtained in the invention according to Claim 2, and the following effect can be obtained by the configuration of succeeding stage. That is, when the HLB value of the water-absorbing material dispersed and blended to a base resin is a small value that is less than 1.5, not only water-absorbability of the oxygen-absorbing resin composition but also promotion of the oxygen absorbing effect becomes insufficient. However, since the HLB value is specified to 1.5 or more in the present invention, the oxygen absorbing effect can be promoted sufficiently, and hereby, the oxygen remaining in the container after sealing is absorbed quickly, and preservability of the contents of the container becomes good. Further, when the ratio of the water-absorbing material dispersed and blended to a base resin is larger than 20%, the oxygen-absorbing resin composition becomes mechanically fragile. However, since the ratio is specified to 20% or less in the present invention, it does not become mechanically fragile, and therefore it is easily manufactured and becomes good in any points such as durability and usability.

Further, because an oxygen absorbent having low compatibility with a base resin can be used, not to mention an oxygen absorbent having high compatibility with a base resin in the invention according to the claimed invention, an oxygen-absorbing resin composition that in superior also in points of versatility and applicability can be obtained.

In the invention according to the claimed invention, since the oxygen absorbent-containing resin layer has a large number of lattice-shaped convex parts and/or concave parts inside the container, the following effect can be obtained. That is, when the oxygen absorbent-containing resin layer has a planar shape, the surface area is small and sufficient oxygen absorbing performance is difficult to obtain. However, since the oxygen absorbent-containing resin layer in the present invention has the above-described shape, its surface area is large, not only the oxygen absorbing performance is improved greatly but also the strength of the sealing part itself increases, and the moldability is good since the dome phenomenon due to the inner pressure of the container can be prevented certainly from occurring, and the oxygen absorbent-containing resin layer has a shape that is appropriate for the molding method such as injection molding in which the molding is performed by pouring the resin material uniformly, even in the case that the content of the container is a carbonated drink, etc., and the inside of the container is in a pressurized state for example.

Further, since the oxygen absorbent-containing resin layer includes the water-absorbing material in addition to the oxygen absorbent in the invention according to the claims, the oxygen absorbing performance increases more, the oxygen remaining in the head space of the container after sealing is absorbed quickly, and the preservability of the contents of the container becomes better.

Then, in the invention according to the claims, the same affect as the effect obtained by the invention according to the above-described claims can be obtained.

The container cap according to the claimed invention has the oxygen absorbent-containing resin layer inside the container, and this oxygen absorbent-containing resin layer is provided by dispersing and blending the oxygen absorbent containing 20% or more of particles having a particle diameter of 1000 μm or less at a ratio of 20% or less to a base resin. That is, since the above-described oxygen absorbent-containing resin layer is formed with the oxygen-absorbing resin composition according to Claim 1, a container cap having the same effect as the oxygen-absorbing resin composition according to Claim 1 is obtained in the invention according to the claims. This is the same for the oxygen-absorbing container plug according to the claimed invention.

The container cap according to the claimed invention has the oxygen absorbent-containing resin layer inside the container, and the configuration of this oxygen absorbent-containing resin layer is the same as the configuration of the latter part of the invention according to the above-described the claims. Therefore, in the invention according to the claims, a container cap with an oxygen absorbent-containing resin layer having the same effect as the effect of the configuration of the latter part of the invention according to in claims can be obtained. This is the same for the oxygen-absorbing container plug according to the claims.

The container cap according to the claimed invention has the oxygen absorbent-containing resin layer inside the container, and this oxygen absorbent-containing resin layer is formed by the oxygen-absorbing resin composition according to the claims. Therefore, in the invention according to in the claims, a container cap with an oxygen absorbent-containing resin layer having the same effect as the oxygen-absorbing resin composition according to the claimed invention can be obtained. This is the same for the oxygen-absorbing container plug according to the claims.

In the invention according to the claims, the same effect as the effect obtained by the invention according to the above-described claims can be obtained, and in the invention according to the claims, the same effect as the effect obtained by the invention according to the above-described claims can be obtained.

BRIEF DESCRIPTION OF THE DRAWINGS

FIGS. 5 (A) and (B) are a perspective view and a partial vertical section view schematically showing the configuration of the oxygen-absorbing container plug according to other examples in the present invention.

EXPLANATION OF THE REFERENCE NUMERALS AND SYMBOLS

1. Cap
2. Cap Shell
4. Container Opening Part
5. Sealing Part (Inner Plug)
6. Oxygen Absorbent-Containing Resin Layer
6a. Convex Part
6b. Concave Part

BEST MODE FOR CARRYING OUT THE INVENTION

An oxygen-absorbing resin composition is provided by dispersing and blending an oxygen absorbent containing 20% or more of particles having a particle diameter of 1000 μm or less at a ratio of 20% or less to a base resin. The oxygen absorbent preferably contains 30% or more of particles having a particle diameter of 1000 μm or less, and more preferably 50% or more. When the particles having a particle diameter of 1000 μm or less are less than 20% and the ratio of the oxygen absorbent having particles having a particle diameter larger than 1000 μm becomes large, that is, the case that the ratio of small particles of the oxygen absorbent becomes small and the ratio of large particles of the oxygen absorbent becomes large, the moldability of the oxygen-absorbing resin composition deteriorates. Further, this case is not preferable because the oxygen absorbing performance is not become high because the entire surface area of the oxygen absorbent (contact area with oxygen in the head space) becomes small and the peeling and the separation of the oxygen absorbent from the base resin easily occur as well as stable oxygen absorbing performance is hardly obtained because the dispersion of the oxygen absorbent is bad and variation occurs depending the product. Further, when the ratio of the oxygen absorbent dispersed and blended to a base resin exceeds 20%, it is not preferable because the rigidity of the sealing part such as a liner and a packing increases and its sealability decreases.

Here, an oxygen absorbent including a compound and the like having reducibility conventionally used in this type of use is used as the oxygen absorbent. Examples of the oxygen absorbents which are salts include potassium sulfite and ascorbic acid salt (L-sodium ascorbate, etc.) other than sodium sulfite. Examples of the oxygen absorbents which are acids include L-ascorbic acid, erythorbic acid, and hydroxycarboxylic acid. Examples of metal powders having reducibility, which is metal-based oxygen absorbents, include reducible iron (powder), reducible tin powder, and reducible zinc (powder), examples of oxides, which is the metal-based oxygen absorbents, include ferrous oxide and triiron tetraoxide, and examples of metal compounds include iron carbite, silicon iron (ferrosilicon), carbonyl iron, and iron hydroxide. Further, a polymer compound having polyvalent phenol can be used as the oxygen absorbent.

Further, for the oxygen-absorbing resin composition, a nonionic surfactant with an HLB value of 1.5 or more is dispersed and blended at a ratio of 20% or less to a base resin as the water-absorbing material. The HLB value is preferably 1.5 to 30, and more preferably 4.3 to 10. When the HLB value is low, promotion of not only water absorbability but also oxygen absorbing effect becomes insufficient, and contrarily, when the HLB value is high, dispersibility to the base resin becomes bad and molding becomes difficult. Therefore, any of these is not preferable. The contained amount of the water-absorbing material in the oxygen-absorbing resin composition is preferably 15% or less to the base resin, and more preferably 10% or less. When the contained amount of the water-absorbing material is small, it is not preferable since not only water-absorbability but also promotion of the oxygen absorbing effect becomes insufficient. And when the contained amount of the water-absorbing material is large, it is not preferable since molding becomes difficult and the oxygen-absorbing resin composition becomes mechanically fragile or too soft.

An example of the above-described water-absorbing material is fatty acid ester such as glycerin fatty acid ester, polyglycerin fatty acid ester, sorbitan fatty acid ester, propylene glycol fatty acid ester, and higher alcohol fatty acid ester. Further, silica gel; an inorganic salt such as calcium carbonate, calcium chloride, and sodium sulfate; and a hydrophilic polymer having a hydrophilic group such as a hydroxy group, an amino group, a carboxylic acid group, and an ester group may be used at a ratio of 20% or less to a base resin as the water-absorbing material together with the above-described water-absorbing materials. Moreover, the contained amount of the water-absorbing material is preferably 20% or less to the base resin. When the contained amount of the water-absorbing material exceeds 20% to the base resin, it is not preferable since the moldability deteriorates and mechanical characteristics of the molded product deteriorate.

The conventionally known thermoplastic resins can be used as the base resin in which the above-described oxygen absorbent and the water-absorbing material are dispersed and blended as long as they are flexible resins having flexibility and cushioning properties and in which an injection molding, a compression molding, or an in-shell molding is possible. Examples include olefin-based resins such as polyethylene, polypropylene, an ethylene-propylene copolymer, a polybutene-1, ethylene-butene-1 copolymer, a propylene-butene-1 copolymer, an ethylene-vinyl alcohol copolymer, an ethylene-vinyl acetate copolymer, and an ion cross-linked olefin-based copolymer (an ionomer); an olefin-based elastomer such as an ethylene-propylene-diene copolymer and a hydrogenated ethylene-propylene-diene copolymer; an SBS elastomer, and SBR, and one kind or two kinds or more of these can be combined and used.

Further, the above-described base resin is preferably a thermoplastic resin in which the oxygen permeability is $10^{-4}$ cc·mm/cm$^2$·day·atm or more in the condition of 23° C. and 40% RH and the water absorbing amount at 23° C. in pure water is 0.01% or more.

Furthermore, the base resin forming the oxygen-absorbing resin composition includes the oxygen absorbent of 1 to 100 parts by weight per 100 parts by weight, and preferably 1 to 50 parts by weight. When the contained amount of the oxygen absorbent is small, the oxygen absorbability becomes insufficient, and contrarily when it is large, the moldability deteriorates.

Further, the above-described base resin includes the water-absorbing material of 1 to 100 parts by weight per 100 parts by weight, and preferably 1 to 50 parts by weight. When the contained amount of the water-absorbing material is small, the oxygen absorbability becomes insufficient, and contrarily when it is large, the moldability deteriorates.

On the other hand, the oxygen-absorbing container cap has the oxygen absorbent-containing resin layer configured using the above-described oxygen-absorbing resin composition. Here, the above-described cap is not limited to a pilferproof cap, and a cap with an arbitrary container lid shape such as a crown shaped cap, a score-breaking type easy opening cap with a tab, a screw cap, a rag cap, and other than those, a cap of a spout (a plug) in a flexible packaging container such as a pouch can be produced with a conventionally known method (such as injection molding and compression molding) and used.

Further, materials used as a material of the conventional cap shell can be used as the material constituting a cap shell of the above-described cap, and examples include olefin-based resins such as polyethylene, polypropylene, an ethylene-propylene copolymer, a polybutene-1, ethylene-butene-1 copolymer, a propylene-butene-1 copolymer, and an ethylene-vinyl acetate copolymer, a synthetic resin such as polystyrene, a styrene-butadiene copolymer, an ABS resin, and a PC resin, a light metal such as aluminum, and a sheet-shaped or a foil-shaped metal material such as a steel plate whose surface is treated with a phosphoric acid treatment, a chromic acid treatment, etc.

In the present invention, the above-described sealing part such as a liner and a packing may include the oxygen-absorbing resin composition in which its entire body forms the oxygen absorbent containing resin layer, and a part other than the oxygen absorbent-containing resin layer may be formed from a different material than the oxygen-absorbing resin composition.

Further, the above-described sealing part can be provided by molding integrally a resin into a cap shell with a compression molding or an injection molding. Further, the above-described sealing part and the cap shell can be integrally assembled after molding the above-described sealing part independently from the cap shell with a compression molding or an injection molding. In this case, the above-described sealing part is made to closely adhere to the cap shell, or it can be made not to be separated by being assembled without being closely adhered.

The embodiment of this invention is explained below by referring to Drawings. Moreover, the present invention is not limited to the embodiments.

Figure 1:
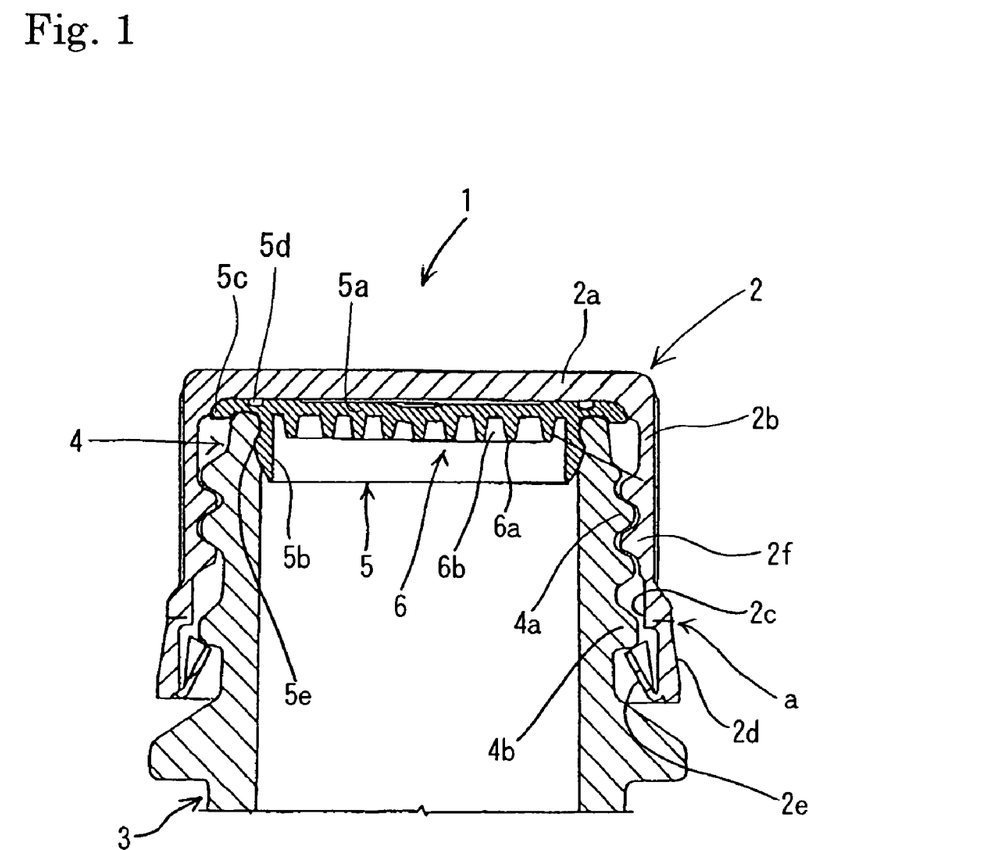
FIG. 1 is an explanation view schematically showing a configuration of an oxygen-absorbing container cap according to one example in the present invention.
Figure 2:
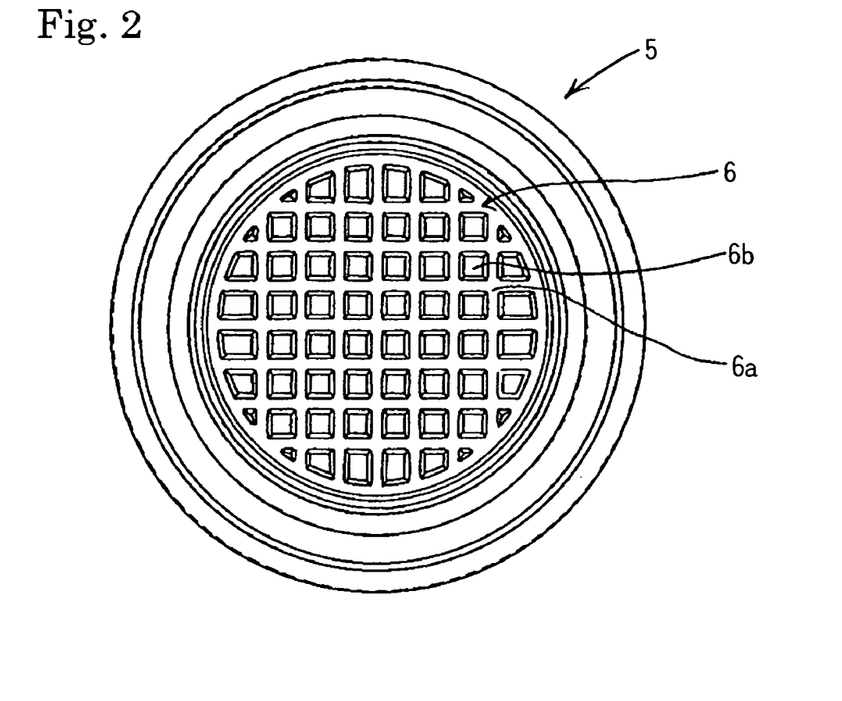
FIG. 2 is a base view schematically showing a configuration of a sealing part in the above-described example.

FIGS. 1 and 2 show one example of the present invention.

An oxygen-absorbing container cap (below, referred to as a cap) 1 of the present embodiment is a pilferproof cap, and is provided with a cap shell 2 made from a synthetic resin and a sealing part 5 located in the cap shell 2, that abuts on an opening part 4 of a container 3 and seals this.

Then, the cap shell 2 is equipped with a shell top board 2a with a circular shape in a plan view, a skirt wall 2b hanging from the peripheral edge of this shell top board 2a, a tamper-evidence band (below, referred to as a TE band) 2d connected to a bottom end of this skirt wall 2b through a plurality of bridges 2c, and an engagement member 2e hanging to the internal upside from the bottom end of this TE band 2d, and a cap screw part 2f screwed to a container screw part 4a formed on the outer peripheral face of the opening part 4 of the container 3 is formed on the inner face part of the skirt wall 2b.

The above-described bridge 2c is formed as follows for example. That is, a plurality of connection pieces (not shown) are formed at fixed intervals in the peripheral direction and in the side of the inner face part over between the skirt wall 2b and the TE band 2d when molding the cap shell 2 with an injection molding, a slit a is formed over circumference in an outer face part of a part corresponding to this connection piece with a cutter, etc., by remaining a part of the connection piece, and the bridge 2c is formed with this connection piece in which one part remains.

The above-described engagement member 2e is a member in which the top end is engaged to an annular projection (bead) 4b formed in lower part side from the container screw part 4a of the opening part 4 of the container 3 when the cap is opened, in which the top end side can be elastically deformed in the direction to expand a diameter, and configured as to get over the ring-shaped projection 4b by elastically deforming in the direction to expand a diameter when the cap is opened, and then to elastically recover to a posture that is capable of engaging downward of the ring-shaped projection 4b.

The above-described sealing part 5 is configured as an inner plug formed separately from the cap shell 2, and this sealing part 5 includes a top board 5a in which the outer peripheral edge is abutting to the top end part of the opening part 4 of the container 3 and an internal leg 5b that is vertically hung from a peripheral part of this top board 5a and fitted to make sealing possible into the opening part 4 of the container 3 when the cap is closed.

A top side sealing part 5c that is curved downward and can be closely contacted to the circumference face of the opening part 4 of the container 3 is formed on the circumference end part of the top board 5a, and an annular concave part 5d that goes along the outer peripheral edge of the top board 5a is formed at a position corresponding to the outer peripheral part of the base of the inner leg 5b in the top face of the top board 5a.

Further, a swollen part 5e swelling outward is formed in the outer peripheral of an intermediate part in the top or bottom direction of the inner leg 5b.

Furthermore, an oxygen absorbent-containing resin layer 6 with almost a circular shape in a bottom face view including an oxygen-absorbing resin composition is provided in a part that is at the inner side from the inner leg 5b in the bottom side (inside of the container) of the top board 5a. This oxygen absorbent-containing resin layer 6 has a shape in which a lattice-shaped convex part and/or concave part are/is provided inside the container, and a plurality of the concave parts 6b are provided between the convex part 6a together with the lattice-shaped convex part 6a being provided inside the container as shown in FIG. 2 in this example. Further, each the concave parts 6b has a rectangular shape or a square shape in bottom face view. However, each the concave parts 6b formed in the peripheral edge part in the oxygen absorbent-containing resin layer 6 has almost a trapezoidal shape or a triangular shape in bottom face view.

Figure 3:
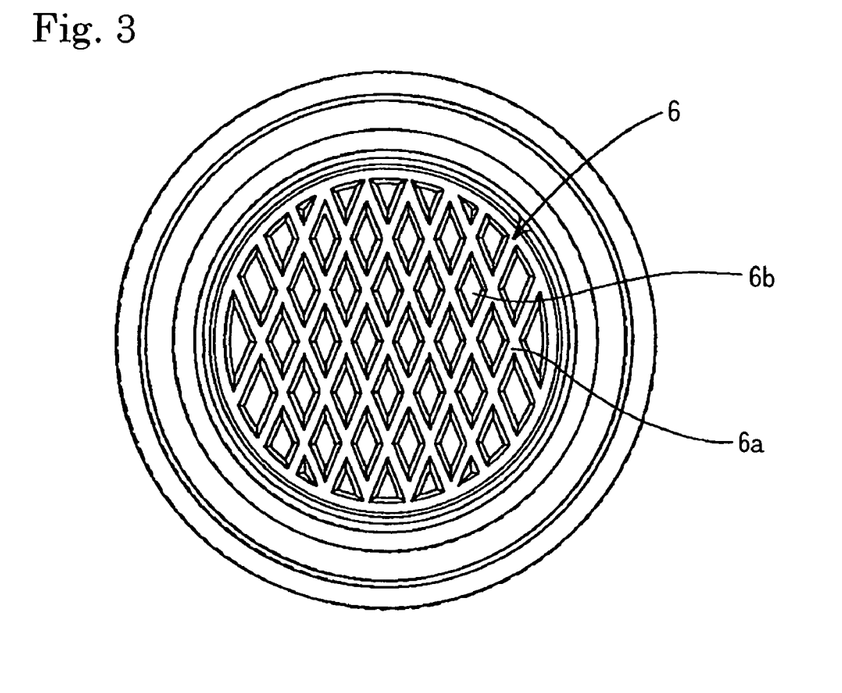
FIG. 3 is a base view schematically showing a configuration of a modified example of the above-described sealing part.

Moreover, the shape of the above-described concave part 6b may be made to be a diamond shape or a parallelogram shape in the bottom face view for example as shown in FIG. 3. The shape of the oxygen absorbent-containing resin layer 6 can have an arbitrary shape other than the shapes described above. Further, the inner leg 5b may have the oxygen absorbent-containing resin layer 6.

The above-described oxygen absorbent-containing resin layer 6 is provided by dispersing and blending sodium sulfite (for example 2.5 parts) containing 20% of particles having a particle diameter of 1000 μm or less as the oxygen absorbent and glycerin ester (for example 5.0 parts) as a water-absorbing material, respectively, at a ratio of 20% or less to a base resin (100 parts) such as polyethylene. The above-described oxygen absorbent-containing resin layer 6 is preferably provided by dispersing and blending sodium sulfite (for example 5.0 parts) containing 50% of particles having a particle diameter of 1000 μm or less as the oxygen absorbent and glycerin ester having an HLB value of 6.5 (for example 2.5 parts) as a water-absorbing material, respectively, at a ratio of 20% or less to a base resin (100 parts).

The entire part of the sealing part 5 having the above-described oxygen absorbent-containing resin layer 6 may be formed from the same material as a material (an oxygen-absorbing resin composition) constituting the oxygen absorbent-containing resin layer 6, and a part other than the oxygen absorbent-containing resin layer 6 may be formed from a different material than a material (an oxygen-absorbing resin composition) constituting the oxygen absorbent-containing resin layer 6.

In the cap 1 made with the configuration described above, the top side sealing part 5c of the top board 5a in the sealing part 5 closely fitted in the container opening part 4 is pushed up by the top end of the cap screw part 2f of the cap shell 2 when the cap is opened, and the inner leg 5b slips out of the container opening part 4, and a position of the engagement member 2e and/or the top end of the cap screw part 2f is set so that the sealing part 5 having the inner leg 5b is started to be pushed up after cutting off the bridge 2c.

That is, it is configured so that the bridge 2c is cut off by the engagement member 2e abutting to the annular projection 4b of the container opening part 4 first when rotating the cap 1 to the direction of opening the cap at opening of the cap, not only the top side sealing part 5c of the top board 5a of the sealing part 5 but also the entire sealing part 5 is pushed up by the cap screw part 2f after its cutting-off, the swollen part 5e of the inner leg 5b of the sealing part 5 slips from the container opening part 4 along with further pushing up of the sealing part 5, and airtightness of the container 3 by the sealing part 5 is canceled for the first time here. Therefore, even when the sealing part 5 is pushed up after the bridge 2c is cut off, leakage of the airtightness of the container 3 does not occur as long as the sealing part 5 is not pushed up to a distance of a length of which the airtightness of the container 3 by the swollen part 5e of the inner leg 5b is canceled.

Further, by the effect of double turning prevention of the sealing part 5 and the cap shell 2 based on friction effect of the inner leg 5b of the sealing part 5, the leakage of the airtightness of the container 3 can be prevented before and after the cutting-off (breakage) of the bridge 2c.

With the above-described configuration, since the airtightness of the container 3 is maintained certainly as long as the bridge 2c is not cut off, leakage of gas, drainage of outer air, and leaking-out of the contents caused by slight opening (a so-called little turning) of the cap due to mischief or carelessness for example that does not involve the cutting-off of the bridge 2c are prevented certainly.

Further, in the cap 1 made with the above-described configuration, the top side sealing part 5c becomes easily deformed elastically toward the center of the container opening part 4 when the annular concave part 5d was formed in the top board 5a of the sealing part 5, and as a result, the airtightness function of the top side sealing part 5c to a circumference corner part of the container opening part 4 becomes high.

Figure 4:
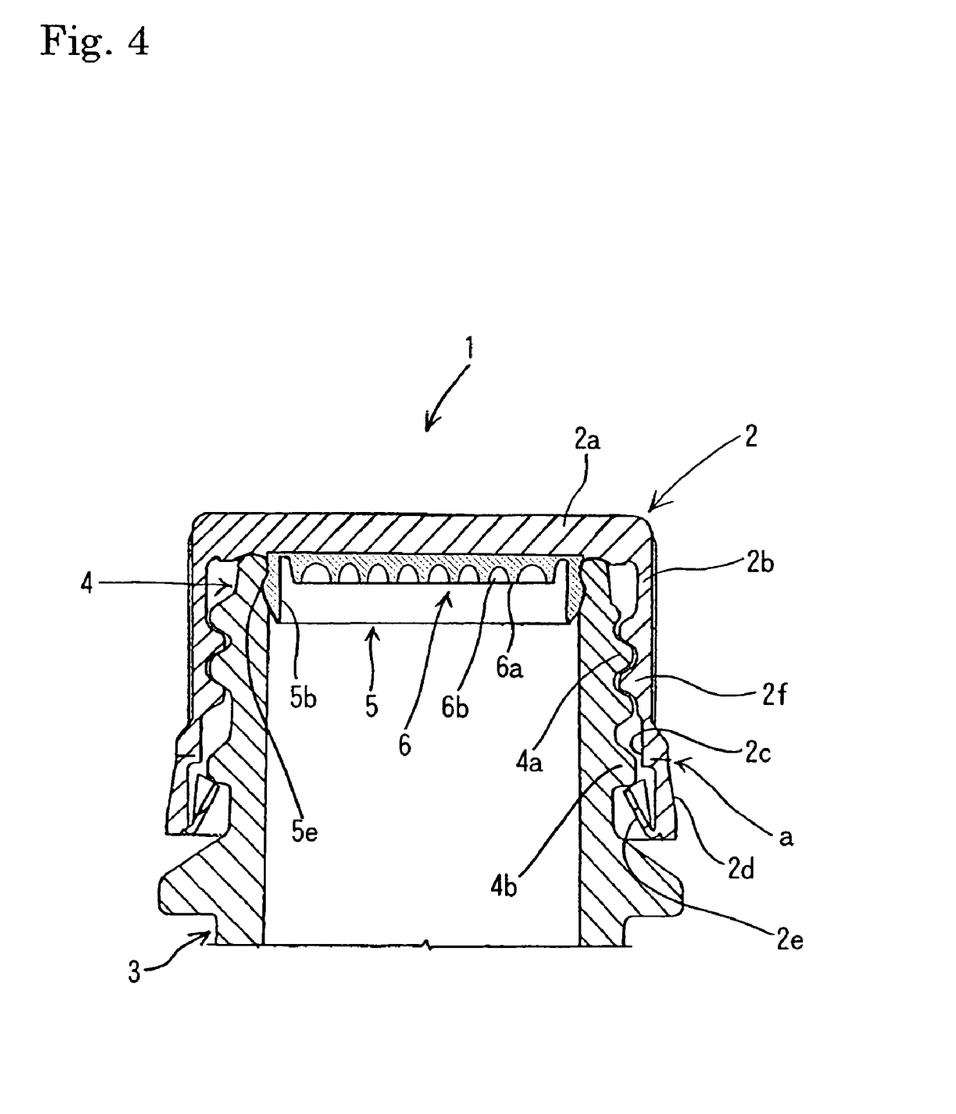
FIG. 4 is an explanation view schematically showing a configuration of a modified example of the above-described oxygen-absorbing container cap.

Moreover, the present invention can be carried out in various deformations without being limited to the above-described example. For example, the above-described sealing part 5 may be configured as a liner or a packing provided by molding a resin integrally with the cap shell 2 with a compression molding or an injection molding as shown in FIG. 4 without making it into a packing or a liner that is an inner plug separated from the cap shell 2. In this case, the oxygen absorbent-containing resin layer 6 can be provided in a part that is at the inner side of the inner leg 5b on the bottom face side of the top board 5a for example. Furthermore, a packing or a liner molded separately from the cap shell 2 may be integrally adhered or fused to the cap shell 2.

Further, the entire cap 1 or a part of inside of the cap shell other than the sealing part 5 may formed from an oxygen-absorbing resin composition (an oxygen absorbent-containing resin). In this case, the above-described oxygen absorbent-containing resin layer contains sodium sulfite (5.0 parts) containing 20% of particles having a particle diameter of 1000 μm or less as the oxygen absorbent and glycerin ester (2.5 parts) as a water-absorbing material to a base resin (polyethylene) (100 parts).

Furthermore, the above-described oxygen absorbent-containing resin layer 6 may be formed from an oxygen absorbent-containing resin film provided by making an oxygen-absorbing resin composition film-shaped, and may be formed from a multi-layer film in which the above-described oxygen absorbent-containing resin film and a base material film to reinforce and protect this oxygen absorbent-containing resin film are pasted together.

Figure 5:
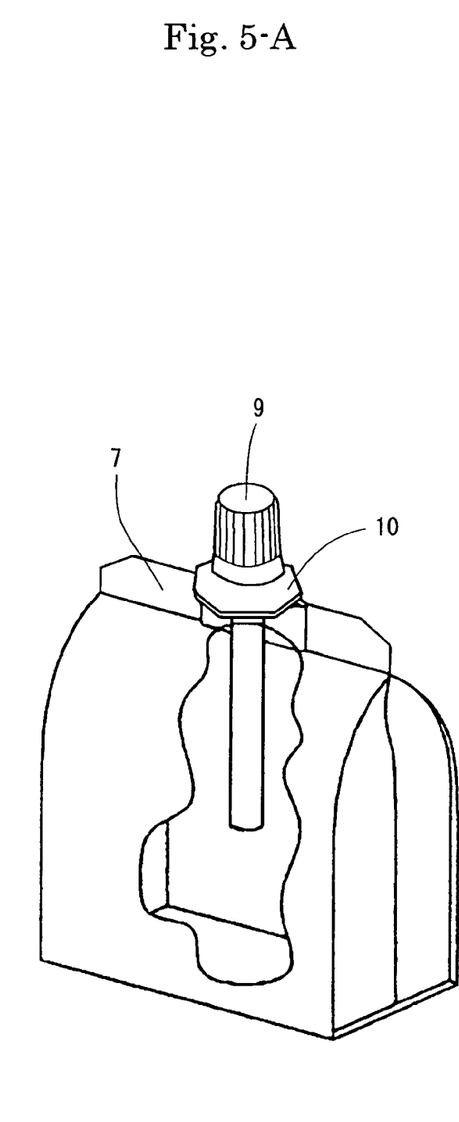

Further, the oxygen absorbent-containing resin layer 6 may be provided at the inner side of the container of a container plug such as spout provided in a soft packaging container such as a pouch for example not only in the cap 1. In this case, the oxygen absorbent-containing resin layer 6 of the oxygen-absorbing container plug is provided by dispersing and blending the oxygen absorbent containing 20% or more of particles having a particle diameter of 1000 μm or less at a ratio of 20% or less to a base resin for example. In detail, as shown in FIGS. 5(A) and (B), the container plug includes a tubular member 8 which is fixed in a state of communicating the inside of the soft packaging container with the outside against a side-wall 7 of the soft packaging container and has a male screw part 8a in the circumference face and a cap 9 which has a female screw part 9a that screws to the male screw part 8a of this tubular member 8 and blocks an opening of the tip of the tubular member 8 so that it can be opened/closed, and the oxygen absorbent-containing resin layer 6 can be provided at least at the inner side of the container of the tubular member 8 and/or at least at the inner side of the container of the cap 9. Moreover, because the cap 9 of the container plug has almost the same configuration as the above-described cap 1, the oxygen absorbent-containing resin layer 6 provided in the cap 9 of the container plug can be made to have the same configuration as the oxygen absorbent-containing resin layer 6 provided in the above-described cap 1, and in the case of providing the oxygen absorbent-containing resin layer 6 in the tubular member 8, the oxygen absorbent-containing resin layer 6 may be provided in the inner wall part of the tubular member 8. Incidentally, in FIGS. 5(A) and (B), a reference numeral 10 is a collar part provided lower than the above-described male screw part 8a in the circumference face of the tubular member 8.

INDUSTRIAL APPLICABILITY

Because the present invention displays an effect of sufficiently removing oxygen remaining in the container after being sealed closely, it can be applied to a packaging container such as a plastic bottle made of polyethylene terephthalate, a glass bottle, and a pouch in which the above-described effect occurs, and a cap, a plug, etc., of these containers.

The invention claimed is:
1. An oxygen-absorbing container cap which has an oxygen absorbent-containing resin layer inside the container cap, wherein the oxygen absorbent-containing resin layer has a lattice-shaped convex part and/or concave part inside the container cap, and wherein the oxygen absorbent-containing resin layer is formed of a base resin which is a thermoplastic resin having an oxygen permeability of $10^{-4}$ cc·mm/cm$^2$·day·atm or more under condition of 23° C. and 40% Relative Humidity and a water-absorbing amount of 0.01% or more in pure water of 23° C., and comprises an oxygen absorbent in an amount of 1 to 100 parts by weight per 100 parts by weight, and the oxygen absorbent-containing resin layer is obtained by dispersing and blending an oxygen absorbent containing 20% or more of particles having a particle diameter of 1000 µm or less at a ratio of 20% or less to the base resin, and a water-absorbing material with an Hydrophile-Lipophile Balance value of 4.3 to 10 at a ratio of 20% or less to the base resin.

2. The oxygen-absorbing container cap according to claim 1, wherein the oxygen absorbent-containing resin layer is formed integrally with a cap shell.

3. The oxygen-absorbing container cap according to claim 1, wherein a sealing part that seals a container by abutting on a container opening part inside of a cap shell has the oxygen absorbent-containing resin layer, and the sealing part is configured to be integrated with the cap shell.

4. The oxygen-absorbing container cap according to claim 1, wherein a sealing part that seals a container by abutting on a container opening part inside of a cap shell has the oxygen absorbent-containing resin layer, and the sealing part is configured as an inner plug that is separated from the cap shell.

5. The oxygen-absorbing container cap according to claim 1, wherein the entire cap is made of an oxygen absorbent-containing resin.

* * * * *